July 20, 1948.  L. A. TROFIMOV  2,445,342
CONSTANT SPEED POWER SUPPLYING APPARATUS
Filed Oct. 2, 1942  5 Sheets-Sheet 1

Inventor
Lev A. Trofimov
By Harry P. Canfield
Attorney

Inventor
Lev A. Trofimov
By Harry P. Canfield
Attorney

July 20, 1948.  L. A. TROFIMOV  2,445,342
CONSTANT SPEED POWER SUPPLYING APPARATUS
Filed Oct. 2, 1942  5 Sheets-Sheet 4

Inventor
Lev A. Trofimov
By Harry P. Canfield
Attorney

July 20, 1948.                L. A. TROFIMOV                2,445,342
                    CONSTANT SPEED POWER SUPPLYING APPARATUS
Filed Oct. 2, 1942                                    5 Sheets-Sheet 5

Fig. 11

Inventor
Lev A. Trofimov
By Harry P. Canfield
Attorney

Patented July 20, 1948

2,445,342

UNITED STATES PATENT OFFICE 2,445,342

CONSTANT SPEED POWER SUPPLYING APPARATUS

Lev A. Trofimov, Willoughby, Ohio

Application October 2, 1942, Serial No. 460,511

23 Claims. (Cl. 318—8)

1

This invention relates to power apparatus for driving a load at constant speed by power supplied by a power source at variable speed.

In the various arts loads are driven at variable speed and a variable speed motor (electric motor, internal combustion engine, etc.) is provided as a source of power. It is desirable in some cases, however, to utilize power from this same variable speed power source to concurrently drive a load at constant speed.

An illustration of such a case would be the driving of a primary load by a variable speed internal combustion engine, and the driving of an auxiliary load, such as an electric generator, at constant speed by a power take-off from the engine.

In other cases, it is desirable to drive the primary or sole load at constant speed from a variable speed power source.

Considered apart from the power source the invention herein described is a power transmission unit; and considered with the power source the invention is a power supplying apparatus.

It is among the objects of the present invention:

To provide generally an improved power apparatus by which a load can be driven at constant speed by a power supplying motor operating at variable speed;

To provide generally an improved power transmission for transmitting to a load to drive it at constant speed, the power of a power source supplied at variable speed;

To provide an improved power transmission of the differential gearing type in which one of the gearing elements is driven by input power at variable speed, and another gearing element supplies output power, and in which improved means is provided to control the speed of the output power element to maintain it at constant speed;

To provide a power transmission of the differential gearing type in which first differential gearing element is driven by input power at variable speed, and a second gearing element supplies output power, and the speed of a third gearing element is controlled in an improved manner to maintain the speed of the output element substantially constant;

To provide a transmission such as referred to above and in which the speed of the third differential gearing element is controlled by causing it to drive an electric generator and by controlling the electric output load of the generator in an improved manner;

To provide a transmission such as referred to above and in which the speed of the third differential gearing element is controlled by causing it to drive an electric generator and by controlling the electric output load of the generator in an improved manner and in which the power supplied to the generator to drive it is recovered.

Other objects will be apparent to those skilled in the art to which my invention appertains. My invention is fully disclosed in the following description taken in connection with the accompanying drawing, in which:

Figures 1, 2:
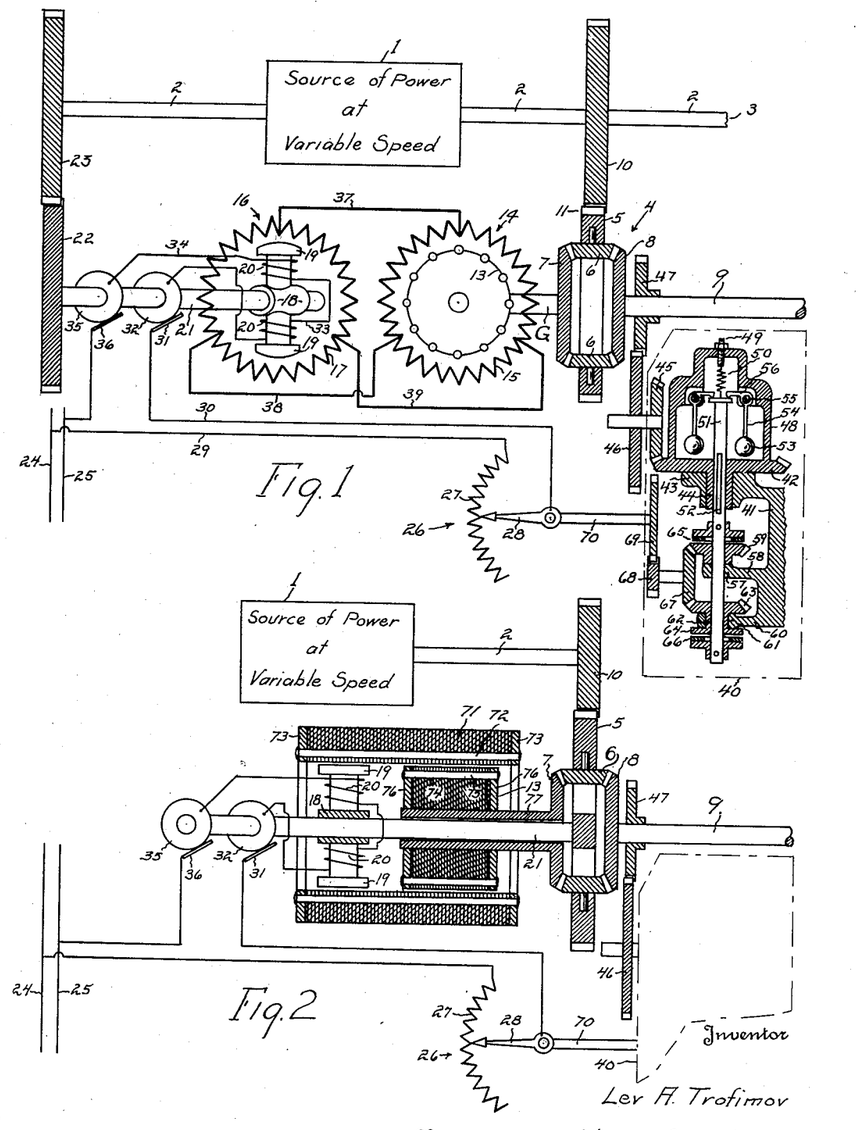
Fig. 1 is a diagrammatic view illustrating an embodiment of my invention.
Fig. 2 is a diagrammatic view illustrating another form in which the invention shown in Fig. 1 may be embodied.

Referring to Fig. 1 of the drawing, I have indicated at 1, diagrammatically, a source of power connected to and driving a shaft 2 at variable speed, and the diagrammatically indicated power source may be any kind of an electric motor or it may be an internal combustion engine, etc. the shaft being broken off at 3 as indicating that it may if desired drive a load not shown at variable speed.

Indicated generally at 4 is a differential gearing comprising a spider 5 rotatably supporting pinions 6—6 and a pair of differential gears 7 and 8 both meshed with the pinions. The differential gear 8 is connected to an output shaft 9 connected to or adapted to be connected to a load to be driven at constant speed, the load having been omitted to simplify the drawing.

The spider 5 is driven by the shaft 2 and to this end, a pinion 10 on the shaft 2 meshes at 11 with teeth provided on the periphery of the spider 5. As will be apparent therefore, the spider 5 is driven at variable speed.

The differential gear 7 is connected by a shaft G to the rotor 13 of an electric generator indicated generally at 14. This generator may be considered as having the physical construction of a squirrel cage induction motor, the squirrel cage rotor of which is the said rotor 13 and the stator 15 of which is shown in the drawing as a three phase winding.

The operation of the generator will be more fully described, but at this point it is noted that the torque transmitted to the rotor 13 to drive it when the generator 14 is generating current, and the torque transmitted to the load shaft 9 to drive it, will always be equal regardless of their relative speeds, because it is a characteristic of a three element differential gearing for example, that shown at 4, that the torque supplied by the spider 5 divides equally as between the differential gears 7 and 8. In contemplation of the end results of the invention, the load shaft 9 is to run at constant speed; and since the spider 5 is driven at variable speed it follows that the shaft G and the rotor 13 will rotate at different speeds at different times; but the equality of torque referred to is always maintained by the differential gearing.

At 16 is illustrated diagrammatically an electro-dynamic unit which functions both as an alternating current generator and as an alternating current synchronous motor. It comprises a three-phase stator winding 17 which may be similar to or identical with the winding 15 referred to. Rotating within the stator winding 17 is a rotor 18 comprising a number of poles 19—19 energized by direct current windings 20—20. Two such poles 19 are shown in the drawing and will be considered as north and south poles respectively, although in practice there may be a greater number of such alternately north and south poles.

The rotor 18 is driven by a shaft 21 on which is a gear 22 driven by a pinion 23 on the variable speed shaft 2. For simplicity of description and discussion of theory which will follow, the diameter of the pinion 23 has been shown as the same as that of the pinion 10, and the diameter of the gear 22 has been shown as the same as that of the spider 5; so that the variable speed at which the rotor 18 is driven is at all times the same as the speed of the spider 5.

The direct current field windings 20—20 are energized from direct current supply mains 24 and 25, under the control of a rheostat shown generally at 26 and comprising a resistor 27 and a rheostat arm 28 movable over the resistor. The current flows from the main 24 by a wire 29 through the resistor 27 to the arm 28, thence by a wire 30 to a brush 31 on a collector ring 32 connected to one of the windings 20, through that winding and by a wire 33 to the other winding 20 and thence by a wire 34 to another slip ring 35 and thence by a brush 36 to the supply main 25. Obviously, the strength of the direct current field produced by the windings 20 is controlled by the rheostat 26.

As mentioned, the stator windings 15 and 17 are preferably alike and they are symmetrically interconnected at corresponding points by wires 37, 38, and 39.

The general operation of the electric units 14 and 16 is as follows. Assuming that the windings 20—20 are energized, and that the rotor 18 is rotated, the uni-directional flux thereof rotating and cutting the winding 17, generates three-phase alternating current in the wires 37, 38, and 39. This three-phase current energizing the three-phase stator winding 15 produces a rotary magnetic field therein within which the rotor 13 is rotated. The velocity or revolutions per minute of the rotating field in the stator 15 is the same as the revolutions per minute of the rotor 18, and from the foregoing description it will be seen that this is the same as the revolutions per minute of the spider 5. With the gearing arranged as indicated in the drawing and with the two stator windings 15 and 17 connected as indicated, the direction of rotation of the rotary field in the stator 15 will be the same as the direction of rotation of the rotor 13 therewithin.

As to the general operation of the apparatus and to clarify the description, let it be assumed that the range of variable speed of the power source is such that it may drive the spider 5 at any speed between say 4,100 and 10,000 revolutions per minute, and first let it be assumed that it is driving the spider 5 at 4,100 revolutions per minute. If now there were no load at all on the load shaft 9, the load shaft 9 and the rotor 13 would both tend to rotate at the same speed namely, 4,100 revolutions per minute and the rotor would rotate at the same speed as the rotating field in the stator 15, that is to say, in synchronism therewith, and the generator 14 would generate no electrical load.

If, however, there be some load however small on the load shaft 9, say the minimum load to be driven, then, due to the characteristics of the differential gearing 4, the load shaft 9 will tend to slow down and the shaft G and the rotor 13 will tend to speed up, and the rotor 13 will rotate faster than the rotating field around it. For example, the load shaft 9 might slow down to 4,000 revolutions per minute and the rotor 13 might speed up to 4,200 revolutions per minute. The bars of the squirrel cage rotor 13 would then be cutting the rotating field in the stator 15 at the relative rate of 100 revolutions per minute. This will develop electrical load at the generator 14 in the rotor bars, and also in the stator field 15 in the wires 37, 38, and 39, and in the winding 17 of the unit 16.

It will be noted here that the unit 14 although constructed like a squirrel cage induction motor acts as a generator just as does an ordinary squirrel cage induction motor if its stator be energized from alternating current supply mains and its rotor be driven above the synchronous speed of the rotating field in its stator. In the case of an ordinary squirrel cage induction motor as just referred to, the supply circuits to the stator act as exciting circuits; and when the rotor is driven above synchronism and current is generated in the stator, these circuits become also the electrical load output circuits of the motor acting as a generator. In Fig. 1, similarly, the circuits 37, 38, and 39 are exciting circuits for the stator 15, and also the electrical load receiving circuits for the unit 14 acting as a generator.

With electrical load developing on the generator 14 due to load on the load shaft 9, and since the torque to drive the shafts 9 and G always equalize, the shaft G will speed up until the electrical load generated has increased to a value at which the torque necessary to drive the rotor 13 exactly equals the torque necessary to drive the assumed minimum load on the load shaft 9, and we will assume that at this point the load shaft is rotating at 4,000 revolutions per minute and that this speed for the said minimum load, is the constant speed at which the shaft 9 is to be driven.

Suppose now that the load on the load shaft 9 should increase. This will tend to slow down the load shaft 9 and speed up the shaft G and rotor 13 to a higher speed at which an increased electrical load is generated by the generator 14; and this will go on until the torque to drive the shaft G equals the torque required to drive the shaft 9.

Now the speed at which the rotor 13 must turn to develop such an electrical load that the torque to drive the rotor 13 balances the higher load torque on the shaft 9, depends upon the strength of the field in the stator 15, and this in turn depends upon the strength of the direct current field produced by the winding 20—20. Therefore if the strength of the direct current fields now be increased, by operation of the rheostat 26, the strength of the field of the stator 15 will be increased and the rotor 13 will slow down, and the load shaft 9 will speed up again, and a balance of torques at the shaft G and the shaft 9 will be obtained with the shaft 9 again running at 4,000 R. P. M. In other words, when load on the load shaft 9 increases tending to slow it down it may be held at its said constant speed of 4,000 revolutions per minute without slowing down by correspondingly operating the rheostat 26 to increase the energization of the windings 20.

Again, if the variable speed source should speed up, (and we will assume that it speeds up to its maximum value of 10,000 revolutions per minute) and accordingly drive the spider 5 and rotor 18 at this high speed, the field in the stator 15 will begin to rotate at 10,000 revolutions per minute; and if the load shaft 9 is to continue to rotate at 4,000 R. P. M., the shaft G and rotor 13 will have to rotate at 16,000 revolutions per minute and the rotor 13 will then be cutting the rotating field around it at a relative velocity of 6,000 revolutions per minute. If the strength of the field 15 remains the same this would develop so great an electrical load at so great torque in the shaft G as to speed up the load shaft 9 above its 4,000 revolutions per minute; but if concurrently therewith the strength of the rotating field 15 be weakened by weakening the energization of the direct current windings 20 by the rheostat 26, the electrical load may be correspondingly reduced so that at the speed of 16,000 revolutions per minute for the rotor 13, the torque required to drive the rotor will again balance the torque required to drive the load 9 at 4,000 revolutions per minute.

It follows that for a decrease of load on the load shaft 9 or for an increase of speed of the rotary power source and the spider 5, the load shaft can be kept rotating at a constant speed by correspondingly weakening the energization of the direct current field windings 20; and vice versa for an increase of load on the load shaft 9 or a decrease of speed of the rotary source.

In the embodiment of the invention of Fig. 1, this operation of the rheostat to control energization of the fields 20—20 is accomplished automatically by a governor shown generally at 40 and operated by rotation of the load shaft 9 itself, and this governor will now be described.

A main frame 41 rotatably supports a bevel gear 42, the gear resting upon a bearing 43 on the frame and the gear having a sleeve or hub rotating in the bearing 43 on a vertical axis.

The bevel gear 42 is rotatably driven by a bevel gear 45 meshed therewith, which in turn is driven by gears 46 and 47, the latter gear being connected to the shaft 9.

Upon the gear 42 is mounted a housing 48. In the top of the housing is an adjusting screw 49 to which is connected one end of a tension spring 50 the lower end of which is connected to a vertically floating shaft 51 which extends downwardly through the hub 44 and has a spline connection therewith at 52 so that the shaft 51 rotates with the gear 42 but has floating movement axially therein, and is suspended by the spring 50.

Centrifugal balls 53 are supported by arms 54—54 on pivots 55—55 within the housing and have arms 56—56 extending toward and resting upon the upper end of the floating shaft 51.

The floating shaft extends downwardly below the gear hub 44 and to and through a bearing bore 57 in a bracket 58 on the frame 41. A bevel gear 59 is supported on the bracket 58 and the floating shaft 51 extends through a bore therein whereby the gear is rotatably mounted on the bracket. A bracket 60 has a bearing bore 61 in which rotates a sleeve 62 on the upper end of which is a bevel gear 63 and on the lower end of which is a flange 64 and the lower end of the floating shaft extends through the gear, sleeve and flange. Above the gear 59 and slightly spaced therefrom is a friction disc 65 connected to the floating shaft 51. Below and slightly spaced from the flange 64 is a similar friction disc 66 connected to the floating shaft. Meshed with both the bevel gears 59 and 63 is a bevel gear 67 connected by gears 68 and 69 to a shaft 70 on which is mounted the rheostat arm 28.

The tension of the spring 50 is adjusted by the screw 49 so that when the shaft 9 is rotating at its said predetermined constant speed, and the centrifugal balls 53—53 are rotated thereby, the balls will hang substantially vertically under their pivots 55; and the friction discs 65 and 66 are disposed so that at such times they will be respectively spaced from the gear 59 and the flange 64.

If the speed of the shaft 9 should tend to increase, increasing the speed at which the balls 53 rotate, they will tend to move outwardly and their arms 56 will press downwardly upon the end of the floating shaft 51, and overcome the balancing tension of the spring 50, and move the friction disc 65 into engagement with the bevel gear 59 and rotate the same, thereby rotating the gears 67, 68, and 69, and the shaft 70, moving the rheostat arm 28 over the resistor 27 to weaken the energization of the field windings 20—20 to cause the speed of the shaft 9 to be restored again to its constant value; whereupon the balls 53 will again take up their normal position allowing the spring 50 to retract the disc 65 out of engagement with the gear 59, and thereby bringing the rheostat arm 28 to rest.

Conversely, if the load shaft 9 should tend to slow down, reducing the speed at which the balls 53 rotate, the balancing spring 50 will be able to overcome the centrifugal force on the balls and raise the floating shaft 51, thereby moving the friction disc 66 into engagement with the flange 64 and rotating the bevel gear 63. This rotates the bevel gear 67 in the other direction, and, acting through the gears 68 and 69 and shaft 70, moves the rheostat arm 28 in the other direction to weaken the energization of the field windings 20—20 to cause the speed of the shaft 9 to be restored again to its constant value, whereupon the balls again take up their normal position and cause the shaft 51 to move downwardly and disengage the friction disc 66 from the flange 64.

Thus any tendency of the load shaft speed to increase or decrease is neutralized, by response of the said governor 40 to the tendency to change speed; and it will be noted that except momentarily when the governor is moving the rheostat arm 28, the friction discs 65 and 66 are disengaged from the gears which they drive. This obviates undue wear of the friction surfaces and also eliminates hunting of the governor above or below the preselected constant speed value, inasmuch as the governor stops moving the arm 28 the instant that the preselected speed of the shaft 9 is attained.

The apparatus as thus far described, regulates to a constant speed the load shaft 9 connected to one differential gear, 8, by correspondingly varying the electrical load developed by the generator 14 driven by the other differential gear, 7. Since the development of electrical load at the generator 14 represents power derived from the spider 5, constant speed of the shaft 9 would be attained at great inefficiency if this power were consumed or lost; but it is one of the features and advantages of this invention that this power is not lost, but is in fact recovered and brought back and applied to the spider 5 in the direction to drive it; so that except for incidental losses by heat, friction, etc. substantially all of the power put into the spider by power source is transmitted to the load shaft 9.

This feature of my invention will now be described and can best be explained by comparing the generator 14 to an ordinary squirrel cage induction motor, and by comparing the electrical unit 16 to a power house alternator of the type having a direct current field which supplies polyphase current to the said ordinary induction motor.

The power house alternator supplies exciting current on, say, three-phase mains, to the stator of the ordinary induction motor, producing a rotary magnetic field in its stator. When the rotor of the ordinary induction motor is driven above synchronism it generates current in these mains supplying it back to the alternator. These mains thus function as the exciting circuit for the induction motor stator, and also as the electrical load receiving circuit therefrom when the induction motor is driven as a generator. This electrical load from the motor acting as a generator is out of phase with the said exciting current from the alternator, and is supplied to the alternating current windings of the alternator and reacts upon the direct current field thereof and produces torque in the rotary element of the alternator propelling it in the direction it is being driven and therefore drives the alternator as if it were a synchronous motor.

A similar situation and set of parts exist in Fig. 1. The unit 16 supplies alternating current from its stator 17 through the mains 37, 38, and 39 to the stator of the unit 14 producing a rotary field therein; the rotor 13 is driven above the speed of this rotating field and generates current in the mains 37, 38, and 39; which, in the stator winding 17, reacts upon the poles 19—19 propelling them around in the direction in which they are being driven thus making the unit 16 function as a synchronous motor. In this manner, the mechanical power put in by the bevel gear 7 and shaft G to the rotor 13 is converted into electrical power at the unit 14; and this electrical power, at the unit 16, is again converted into mechanical power to drive the shaft 21. From the shaft 21 this power is transmitted through the gears 22, 23 back to the shaft 2, where it is delivered through the gear 10 to the spider 5. In general, the generator 14 may thus be said to drive the motor 16, and the motor 16 may be said to drive the generator 14, so that in this double conversion of power no power is actually consumed except incidental losses.

It will be seen therefore that the speed of the load shaft is maintained constant at a preselected speed by varying the load on the generator 14 by changes in the excitation of the generator supplied by an exciter 16, the output of the exciter being varied by changes in the energization of its winding 20 effected by the rheostat 26, the latter being operated responsive to any tendency of speed of the load shaft 9 to change.

In Fig. 2 the apparatus of Fig. 1 is shown in a more compact or unitary construction. In this form, a single stator 71 is provided instead of the two stators 15 and 17 of Fig. 1. It consists of a generally tubular laminated field element having a cage of conducting bars 72—72 short circuited upon end rings 73—73. Within this stator, the direct current field poles 19—19 rotate, energized by the direct current windings 20—20, and within this stator also rotates the rotor 13, shown here in the form of the rotor of a squirrel cage induction motor and comprising a laminated body 74 supporting a cage of conducting bars 75 short circuited upon end plates 76—76. The shaft 21 upon which is mounted the rotor 18 having the poles 19 and field winding 20, is connected directly to the spider 5. The rotor 13 is mounted upon a sleeve 77 surrounding the shaft 21 and connected to the bevel gear 7.

In this form, the bars 72 function as do the windings 15 and 17 and the interconnecting wires 37, 38, and 39 of the form of Fig. 1. The operation of this form is substantially the same as that described for the form of Fig. 1. The rotor 18, driven at the speed of the spider 5, generates alternating current in the bars 72 which produces a rotary field in the stator 71, within which the rotor 13 driven by the differential gear 7 rotates. The rotor 13 being always driven at a greater number of revolutions per minute than the field in the stator 71, generates current in the bars 72 which reacts upon the poles 19 of the rotor 18 propelling it as the rotor of a synchronous motor.

Here again, the torque required to drive the rotor 13 is equal to the torque developed on the load shaft 9; and the torque required to drive the rotor 13 is determined by the strength of the rotating magnetic field of the stator 71, and this is determined by the degree of energization of the windings 20, which in turn is determined by the rheostat 26 under control of the governor 40 responsive to the speed of the load shaft 9, all as described in connection with the form of Fig. 1.

Whereas in the form of Fig. 1, the power put into the generator 14 and recovered at the synchronous motor 16 on its shaft 21 is returned again to the spider 5 through the gears 22, 23 and 10 and the shaft 2, in the form of Fig. 2, it will be seen that the electrical power applied to the rotor 18 when acting as the rotor of a synchronous motor is delivered back to the spider 5 directly by the shaft 21.

The governor 40 in Fig. 2 is indicated diagrammatically by the broken line outline, and may be considered as comprising the parts of the governor of Fig. 1 enclosed by the broken line 40 of that figure.

Figure 3:
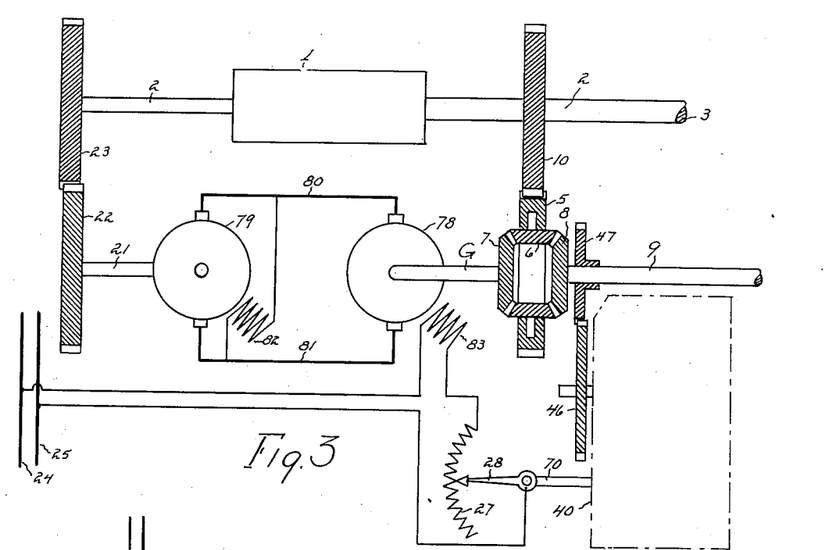
Figs. 3, 4, 5, 6, and 7 are diagrammatic views illustrating other embodiments and modifications of my invention.

In the form of my invention illustrated diagrammatically in Fig. 3 a direct current generator 78 is driven by the shaft G instead of the induction generator of Figs. 1 and 2; and the electrical load developed by the generator 78 is recovered by means of a direct current motor 79 instead of by the synchronous motor action of the unit 16 of Figs. 1 and 2.

In this form, the variable speed power source 1 drives the differential gearing spider 5 by the shaft 2 and pinion 10, and the spider drives the differential gears 7 and 8, the differential gear 8 being connected to the load shaft 9 and the differential gear 7 being connected to the shaft G.

The generator 78 is connected by electric load output mains 80, 81 to the motor 79 to drive it and the motor may be energized by a field winding 82.

The motor 79 is connected by gears 22 and 23 to the shaft 2 of the power source 1, it being contemplated that the power of the motor 79 will be transmitted back to the spider 5 through this interconnection therewith.

The electrical load on the generator 78 will be determined by energization of its direct current field 83 under the control of the rheostat 26.

It is believed that in view of the more complete description of the form of Fig. 1, a brief description of this form will suffice. If the power source motor 1 be rotating at its minimum speed to rotate the spider 5 at say 4,100 revolutions per minute, and with the minimum load on the load shaft 9, the G shaft will be rotating at 4,200 revolutions per minute and the load shaft 9 at 4,000 revolutions per minute. The action of the governor 40 which as indicated by the broken line may be the governor of Fig. 1, will operate the rheostat arm 28 to establish an energization of the generator field 83 to cause these conditions to obtain.

If the gears 22 and 23 are of the same diameter as the spider 5 and pinion 10, the motor 79 will now be driven at the speed of the spider or 4,100 revolutions per minute, which is 100 revolutions per minute slower than the generator 78. The electrical load on the generator 78 will be such that the torque in the shaft G balances the torque in the load shaft 9; and the electric load of the generator 78 drives the motor 79; and the power of the motor 79 is transmitted back to the spider 5 from which it was in effect derived through the mechanical interconnection therewith; so that the power driving the generator 78 is recovered and not lost.

An increase of load on the load shaft 9 at its speed of 4,000 revolutions per minute, will cause it to tend to slow down and cause the G shaft to tend to speed up and drive the generator 78 faster; but the load shaft acting through the governor 40 will then strengthen the field 83 until the torque in the G shaft balances that in the load shaft 9 at 4,000 revolutions per minute so that the load shaft will not slow down.

If the source motor 1 should speed up, it will speed up the spider 5 and tend to speed up both the generator 78 and the load shaft 9; but the load shaft 9, acting through the governor 40 will operate the rheostat 28 to weaken the field 83 to cause the generator torque on the G shaft to be equal to the load torque on the load shaft 9, at 4,000 R. P. M. of the latter so that the load shaft 9 will not speed up. The motor 79, connected to the spider will also go faster, but the generator 78 which rotates faster than the spider will rotate faster than the motor 79 and deliver electrical power thereto to drive it as before.

It will be seen therefore that the end results of the form of Fig. 3 are substantially the same as those of the form of Fig. 1 or 2. The load shaft 9 is caused to rotate at constant speed by varying the electrical load output of the generator 78 by an exciter winding, the winding 83. The mechanical power converted by the generator 78 into electrical power is again converted into mechanical power at the motor 79 and this may be considered as supplied back to the source motor or as supplied to the spider 5 whence it originated; so that the power put into the generator 78 is not lost and as in the form of Figs. 1 and 2, substantially all of the consumed power put into the spider 5 goes into the load shaft 9.

Figure 4:
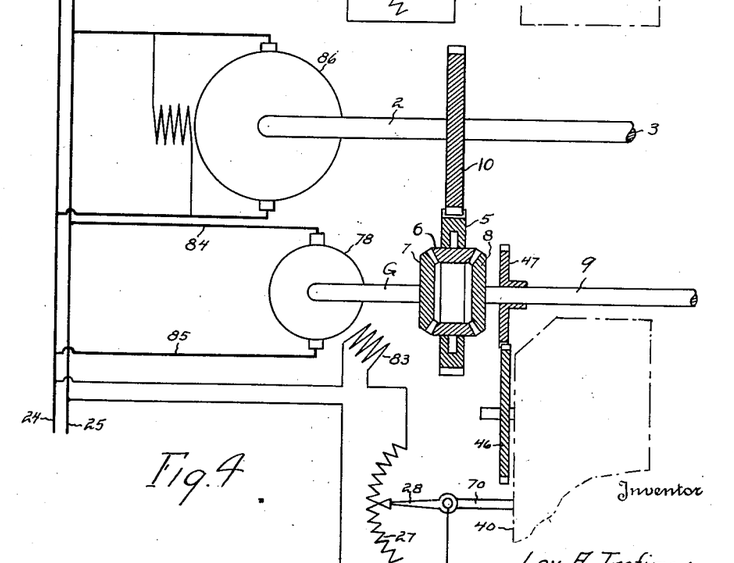

In Fig. 4 is illustrated a modification of the form of Fig. 3. Most of the parts have the same reference characters as in the other figures and description thereof is believed to be unnecessary. The difference in this form is that the electrical load of the generator 78 is conserved, not by converting it into mechanical power, but by supplying it by wires 84—85 to the direct current supply mains 24—25. The variable speed power source in this case may be an engine, etc., but in this modification is shown as an electric motor 86 driving the load shaft 2, and its speed may vary because of changes of load on the load shaft 2 driven by that part of the shaft 2 which to simplify the drawing has been broken off as shown at 3; and the motor 86 may be supplied with current from the mains 24—25. Thus again, the variable power put into the generator 78 in controlling the speed of the load shaft 9 may be considered either as merely recovered in the system 24—25, or as recovered at the motor 86, the shaft 2 and spider 5 as before. The governor may again be the governor 40 as indicated.

Figure 5:
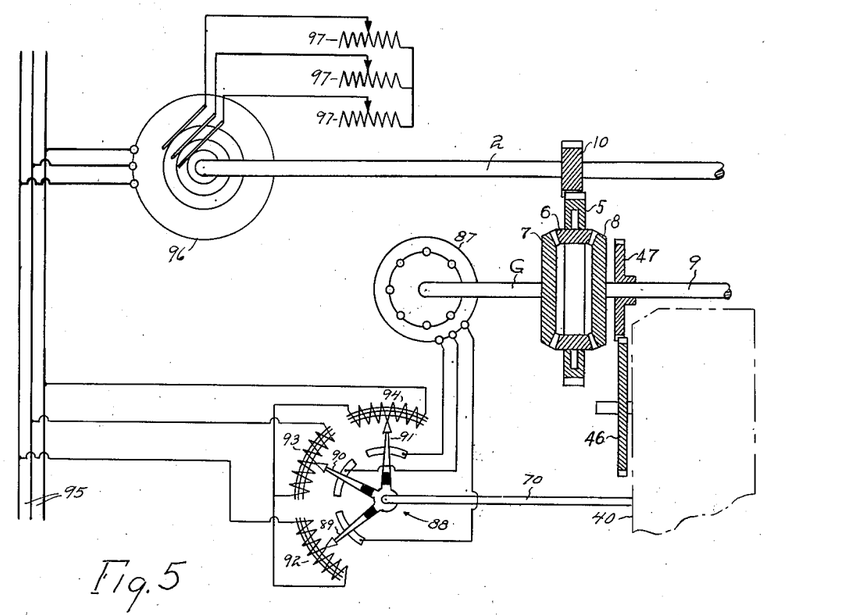

In Fig. 5 is shown a modification of the form of my invention of Fig. 4 and wherein the generator and the variable speed power source motor are alternating current units. The generator 87 on the G shaft is a three phase induction generator, the stator of which is energized with three-phase alternating current to provide a rotary field therefor, and the energization of the field is varied by a device shown generally at 88 operated by the aforesaid governor shaft 70 to vary the potential on the stator to adjust the torque of the G shaft to maintain the load shaft 9 at constant speed as described hereinbefore. The device 88 has three arms 89, 90, and 91 rotated by the shaft 70 and moving over taps on auto transformers 92, 93, and 94 supplying current to the stator 87 from three-phase alternating supply mains 95 as indicated and well understood by those skilled in the art. There is in this case a fixed velocity of revolution of the rotating field in the stator 87, and the rotor of the generator always rotates above this speed.

The variable speed power source, 96, is an alternating current slip ring induction motor supplied with current from the mains 95; and its speed is varied to drive a primary load at variable speed by its shaft 2, by adjusting resistors 97 in its rotor circuit in a well known manner.

Figure 6:
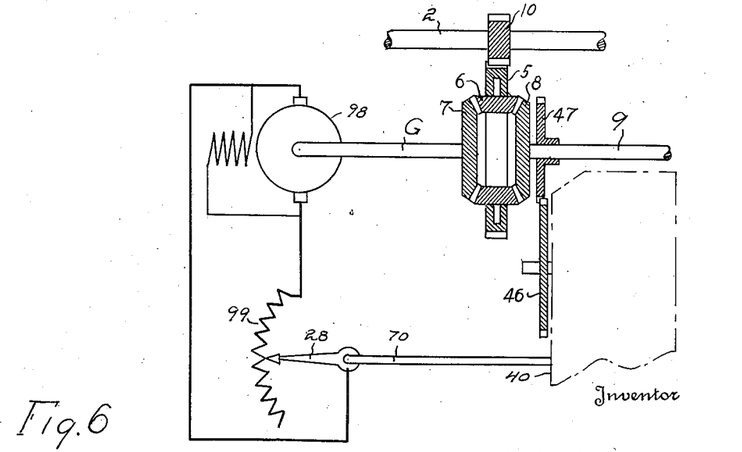

In the form of Fig. 6, it is contemplated that the load on the constant speed shaft will at all times be relatively small, so that the power to drive the generator on the G shaft, in this case the generator 98, and the electrical power generated thereby to control the speed of the load shaft, will be small power, and may be lost or consumed without serious loss of efficiency. To this end, the generator 98 has a load circuit in the form of a resistor 99; and the rheostat arm 28 moved by the shaft 70 of the govenor 40 varies the amount of the resistance of the resistor 99 in the load circuit, to vary the torque on the shaft G for the purposes described.

Figure 7:
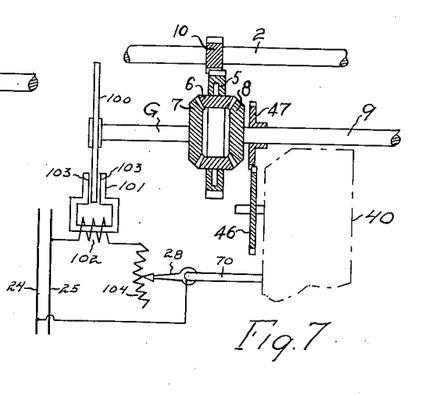

In other cases, the load on the load shaft 9 and the torque to drive it, may be so small that a mere braking action on the G shaft will be sufficient to control the speed of the load shaft 9, and such an arrangement is shown in Fig. 7.

A metallic disc 100 is mounted on the G shaft; and adjacent thereto is an electro-magnet 101, having a winding 102, and pole faces 103—103 on opposite sides of and adjacent to the disc. Flux flowing between the pole faces and through the rotating disc will generate current in the disc and exert a drag thereon commeasurable with the energization of the winding 102 in a well known manner.

The winding 102 is energized from the mains 24—25 through a resistor 104 under the control of the rheostat arm 28 which is turned by the shaft 70 of the governor 40. The torque to drive the G shaft may thus be controlled to control its speed to maintain the shaft 9 at constant speed as will now be understood from the foregoing description of the other forms.

In the foregoing forms, a governor 40 has been illustrated and described in detail, and this same governor has been indicated as associated with the various modifications. It will be understood, however, that other types of governors having other modes of operation may be employed; and in Figs. 8, 9, and 10 other governors are illustrated.

These governors in each case rotate a governor shaft 70, and a rheostat arm 28, and therefore such governors may be applied to the forms previously described instead of the governor 40. The governors of Figs. 8, 9, and 10 have in common the feature that they are actuated by electric current or electric potential produced by a generator driven by the load shaft 9. In each case, this governor generator may be a generator of small size and output provided especially for actuating the governor, in which case the main load driven by the load shaft 9 would be another and different load; or, the main load contemplated to be driven by the load shaft 9 may be an electric generator, in which case potential of the main load generator may be used to actuate the governor.

Figure 8:
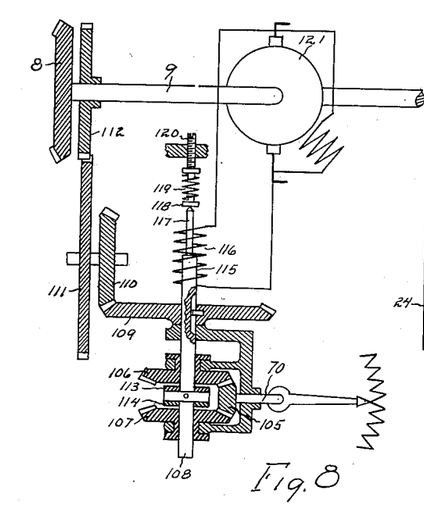
Figs. 8, 9, 10 and 11 are views illustrating separately, different forms of a governing apparatus which I may employ, and one form of which is illustrated in Fig. 1 in association with the rest of the apparatus.
Figures 9, 10:
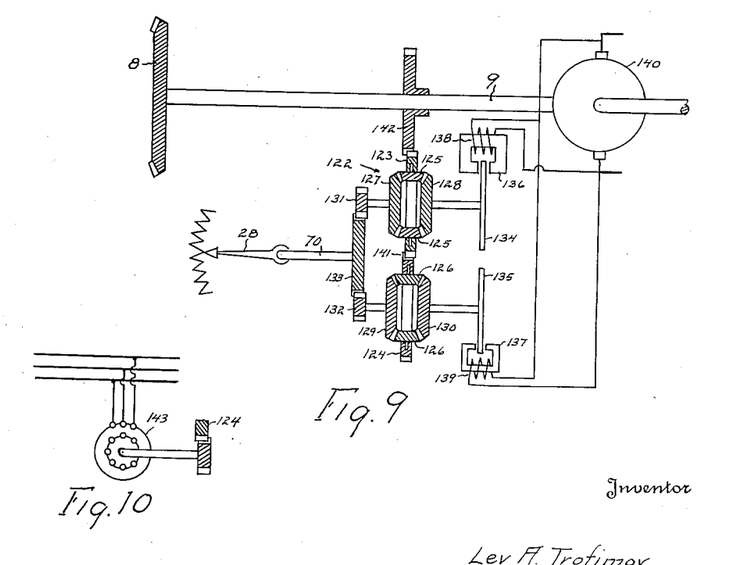

The generators driven by the load shaft 9 in Figs. 8, 9, and 10 may therefore be considered either as generators provided for governing purposes, or, as the main load generator driven by the load shaft 9.

In Fig. 8, the governor is shown somewhat diagrammatically. The governor shaft 70 referred to is driven in one direction or the other by a bevel gear 105, constantly meshed with axially aligned bevel gears 106 and 107. A vertical floating shaft 108 passes through the bevel gears 106 and 107, and is driven by a gear 109 splined thereon, the gear 109 being driven through gears 110, 111, and 112 by the load shaft 9.

The floating shaft 108 has thereon and between the bevel gears 106 and 107, friction discs 113 and 114, slightly spaced respectively from the bevel gears 106 and 107; and the shaft 108 is normally suspended to dispose the discs in this relationship by a magnetic plunger 115 in a winding 116.

The plunger 115 has a stem 117 abutting upon a block 118 which is engaged by one end of a compression spring 119, the other end of which spring engages an adjusting screw 120 by which the compression tension of the spring may be adjusted. The winding 116 is energized across the terminals of the generator 121 driven by the load shaft 9.

By this arrangement, the desired constant normal speed of the shaft 9 will, by driving the generator 121, cause it to generate a normal potential which energizing the winding 116, will cause it to counterbalance or support the floating shaft 108 with the friction discs 113—114 normally disengaged from both the bevel gears 106—107; and this position may be adjustably determined for the shaft 108 by adjusting the spring 119, which opposes the pull of the winding 116 on the plunger 115.

If the load shaft 9 should tend to increase in speed, it will tend to increase the voltage on the winding 116 and cause it to raise the floating shaft 108 from its normal position, or, if the load shaft speed should tend to decrease it will allow the floating shaft 108 to move downwardly. In one case or the other the friction discs 113—114 will engage the bevel gear 106 or the bevel gear 107, and as will now be understood this will rotate the governor shaft 70 in one direction or the other, moving the rheostat arm 28 over the associated resistor. This has the effect as described in the several modifications of neutralizing the tendency of the shaft 9 to change its speed, bringing it back to and holding it at its said preselected constant speed.

The governor shown in Fig. 9 drives the governor shaft 70 and rheostat arm 28 for the purposes described by means of a double differential gearing mechanism shown generally at 122. This mechanism comprises two spider elements 123 and 124, rotatably supporting respectively, pairs of pinions 125—125 and 126—126. Meshed with the pinions 125 are differential gears 127 and 128; and meshed with the pinions 126 are a pair of differential gears 129 and 130. The differential gears 127 and 129 are connected respectively to pinions 131 and 132 both of which are meshed with a gear 133 on the governor shaft 70. A pair of metallic discs 134 and 135 are connected to the differential gears 128 and 130 respectively.

Electro-magnets 136 and 137 having energizing windings 138 and 139 are provided with pole pieces adjacent opposite sides of the discs as illustrated, whereby flux in the magnets produced by the windings will exert a braking action on the rotation of the discs 134—135 as is well known. The windings 138 and 139 are energized across the terminals of an electric generator 140 driven by the shaft 9 as described hereinbefore.

The two spiders 123—124 are driven in opposite direction by power from the shaft 9, and this may conveniently be done by providing gear teeth on the peripheries of the spiders and meshing them together as at 141, and driving one of the spiders by a gear 142 on the shaft 9. For simplicity of description, it is assumed that the two spiders 123 and 124 are of equal diameter, as are the two pairs of differential gears associated with the spiders respectively and as are the pinions 131 and 132.

With this arrangement, the discs 134 and 135 are driven in opposite directions, and the pinions 131 and 132 tend to rotate in opposite directions and exert opposite torques on the governor shaft 70. If the two discs 134 and 135 have equal braking torques applied thereto, the torques of the pinions 131 and 132 will be equal and the governor shaft 70 will remain at rest, or come to rest if rotating. If the braking torque of one disc is made greater than that of the other the torque on the corresponding pinion will be greater than that on the other and the governor shaft accordingly will rotate in one direction or the other.

To thus vary relatively, the torques on the discs 134—135 the following means is provided.

The potential produced by the generator 140 may be called for the sake of this discussion, normal, when the shaft 9 is rotating at its preselected constant speed.

The windings 138 and 139 are subjected to the potential of the generator 140 as shown. One of the magnets say, the magnet 137 is made of sufficiently small cross-section area and is energized sufficiently by the winding 139 so that it is at all times substantially saturated whereby increase or decrease of potential on its winding produces no change or only a small change in the flux of the magnet.

The magnet 136, however, is energized by its winding 138 below saturation. The cross-sectional area of the magnet 136 is predetermined so that it produces the same electro-dynamic drag on the disc 134 as does the saturated magnet 137, on the disc 135, when the generator potential is normal.

It follows that magnetism in the magnet 137 remains substantially constant, whereas, magnetism in the magnet 136 rises and falls with changes of potential; and that both magnets produce the same braking effect when the potential is normal.

If the shaft 9 should tend to increase in speed and cause the generator voltage to rise above normal, magnetism in the magnet 136 will increase and produce greater drag on the disc 134 than that on the disc 135; and conversely, if the shaft 9 should tend to decrease its speed and lower the potential below normal, the magnet 136 will produce less drag than the magnet 137.

It follows that if the shaft 9 should tend to increase in speed the rheostat arm 28 will be turned in one direction, and if the shaft 9 should tend to decrease its speed, the rheostat arm 28 will be turned in the other direction; and in either direction will neutralize the change and restore the speed to the preselected value, and the rheostat arm 28 will come to rest in a corresponding position. It is not essential that the magnet 137 be saturated. The operation will be substantially as described if it be more nearly saturated than the magnet 136.

In Fig. 10 is illustrated a modification of the arrangement of Fig. 9. In this form, instead of driving the two differential spiders 123 and 124 by the shaft 9, a supplemental motor 143 is provided for this purpose. A squirrel cage induction motor is shown, but any type of motor may be provided, and it is immaterial whether it is strictly speaking a constant speed motor or not, inasmuch as the absolute speed at which the spiders are driven is immaterial.

Obviously, the generator 140 of Fig. 9 may be an alternator and the current for energizing the braking magnets may be alternating current; or it may be rectified into uni-directional current, it being believed that this is so well understood by those skilled in this art as not to need illustration or further description.

Figure 11:
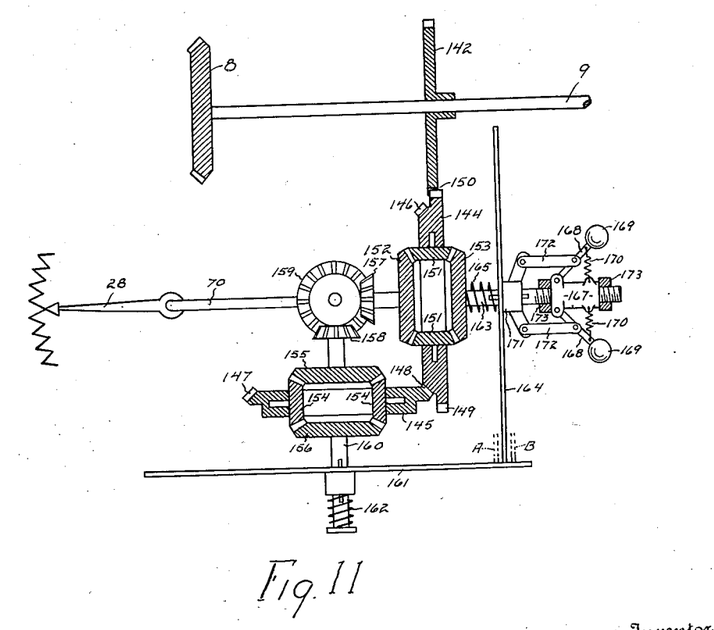

The governor shown in Fig. 11 is a governor of the centrifugal type. It comprises a pair of differential gearing spiders 144 and 145 provided respectively with bevel gear teeth 146—147 mutually meshed as at 148; and the spider 144 has also radial or spur teeth 149 meshed as at 150 with the teeth on the above described gear 142 on the load shaft 9; whereby, the spiders 144—145 are driven in opposite direction by the load shaft.

The spider 144 rotatably supports pinions 151—151 meshed with differential gears 152 and 153; and the spider 145 rotatably supports pinions 154 meshed with differential gears 155 and 156.

The differential gears 152 and 155 respectively drive bevel gears 157 and 158 both of which mesh with a single bevel gear 159 connected to the governor shaft 70 the rotation of which moves the rheostat arm 28 for the purposes hereinbefore described.

The differential gear 156 rotatably drives a shaft 160 upon which is splined, for rotational movement with and axial movement on the shaft, a relatively thin disc 161 yieldingly held toward the differential gear 156 by a compression spring 162. The differential gear 153 drives a shaft 163 on which is similarly splined a disc 164, and a compression spring 165 yieldingly holds the disc 164 away from the differential gear 153.

The disc 161 as here illustrated is of larger diameter than the disc 164, and the periphery of the disc 164 engages the face of the disc 161, and the two discs are maintained in positive frictional engagement by the spring 162, whereby one may drive the other. The disc 164 may move or be moved axially along the shaft 163, and its diameter is such that for one axial position thereof, namely that illustrated in solid line, the radius of the circle of contact on the disc 161 is the same as the radius of the disc 164; whereby both discs are constrained to rotate at the same velocity or revolutions per minute; and when the disc 164 is moved inwardly, say to the dotted line position A, the disc 161 will be constrained to rotate faster than the disc 164; and similarly if the disc 164 be moved in the other direction, say to the dotted line position B, the disc 161 will be constrained to rotate slower than the disc 164.

Mounted on the shaft 163 is a head 167 pivoted to which is a pair of governor ball arms 168—168, upon which are provided governor centrifugal balls 169—169. Springs 170—170 tend to draw the balls toward the head 167 and upon rotation of the shaft 163 the balls tend to move outwardly against the tension of the springs. The arms 168—168 are connected to the disc 164 or to a hub 171 thereon by links 172—172.

From the foregoing description it will be apparent that when the spiders 144—145 are driven in opposite directions by the load shaft 9, they tend to drive their associated differential gears in the same direction in which they themselves rotate. It follows that the bevel gears 157—158 tend to be rotated in opposite directions, and that the discs 161 and 164, frictionally engaged with each other, are free to rotate in opposite directions one upon the other. If the disc 164 is in the position in which both discs rotate at the same speed, the bevel gears 157 and 158 will tend to rotate at the same speed but since they are both geared to the gear 159 they will remain at rest and the governor shaft 70 will remain at rest.

Movement of the governor balls 169—169 outwardly, acting through the links 172—172, will move the disc 164 inwardly thereby causing one bevel gear 157 or 158 to rotate faster than the other and turn the bevel gear 159 and the governor shaft 70 in one direction. If the balls 169 move inwardly and thereby move the disc 164 outwardly the governor shaft 70 similarly is caused to rotate in the other direction.

The tension of the governor springs 170—170 is predetermined to overcome outward movement of the balls and position the discs at the one-to-one disc ratio described when the load shaft 9 which is driving the balls is rotating at the predetermined or preselected speed. Thus it follows that at the preselected speed of the load shaft 9, the governor shaft 70 remains at rest and upon an increase or a decrease of that speed the governor shaft 70 is rotated in one direction or the other to effect restoring of the load shaft speed to the preselected value as hereinbefore described, whereupon the balls 169 again take up the position corresponding to the one-to-one ratio of the discs.

The head 167 may be positioned axially along the shaft 163 to change the tension of the springs 170 by means of a pair of lock nuts 173—173 threaded on the shaft 163; and by means of the adjustment thus provided, the governor shaft may be caused to remain at rest when the load shaft 9 is rotating at the preselected speed; or, upon changing the position of the head 167 the speed of the load shaft may be brought to any desired speed and thereby be predetermined.

In the governor of Fig. 1, the speed of the load shaft 9 may similarly be determined by adjustment of the tension of the spring 50 by the screw 49; and in the governor of Fig. 8 the speed of the load shaft may be predetermined by adjusting the screw 120.

As was stated hereinbefore and as is now believed to be clear, the several constructions of governors disclosed herein may be applied to any one of the forms of the invention shown and described for maintaining the speed of the load shaft 9 constant.

As will be understood by those skilled in this art, differential gearing of the planetary type may be used instead of the type illustrated and described; and that gear ratios other than those shown may be employed; and that in other respects also, my invention is not limited to the exact details illustrated and described, and that changes and modifications may be made; and that my invention comprehends all such changes and modifications which come within the scope of the appended claims.

I claim:

1. In a transmission for transmitting power at constant speed from a variable speed power source; a power input element to be driven by the variable speed source; a power output element; power transmission means between the two elements, comprising an electric generator having an electric load circuit and mechanism differentially dividing the power from the input element between the generator and the output element; and control means controlling the electrical load of the generator to control the speed of the output element and being operable responsive to an increase or decrease of the speed of the output element to change the generator load to respectively effect decrease or increase of the output element speed to maintain the speed of the output element substantially constant.

2. In a transmission for transmitting power at constant speed from a variable speed power source; a power input element to be driven by the variable speed source; a power output element; power transmission means between the two elements, comprising an electric generator having an electric load circuit and mechanism differentially dividing the power from the input element between the generator and the output element; and means controlling the electrical load of the generator operable responsive to the speed of the output element to maintain the speed of the output element substantially constant; and means to convert the electrical load of the generator into mechanical power and transmit it to the power input element.

3. A transmission for transmitting power to a load at constant speed from a variable speed power source; comprising a differential gearing having a spider element rotatably supporting a pinion and two differential gears meshed with the pinion; one differential gear constituting a power output element; the spider element being driven by the power source; the other differential gear being connected to an electric generator to drive it; an electric load circuit for the generator; means to neutralize the tendency of the output element to change speed comprising control means to change the electrical load of the generator, operable responsive to an increase or decrease of the speed of the output element, to respectively effect decrease or increase of the output element speed.

4. A transmission for transmitting power to a load at constant speed from a variable speed power source; comprising a differential gearing having a spider element rotatably supporting a pinion and two differential gears meshed with the pinion; one differential gear constituting a power output element; the spider element being driven by the power source; the other differential gear being connected to an electric generator to drive it; an electric load circuit for the generator; means to neutralize the tendency of the output element to change speed comprising control means to change the electrical load of the generator, operable responsive to speed of the output element; and means to convert the electrical load of the generator into mechanical power and transmit it to the spider element.

5. In a transmission for transmitting power at constant speed from a variable speed power source; a power input element to be driven by the variable speed source; a power output element; power transmission means between the two elements comprising an alternating current stator, a direct current field element driven at speed proportional to that of the input element for producing a rotary alternating current field in the stator, an induction generator comprising a rotor rotating within the rotating field and having a load circuit and mechanism differentially dividing the power from the input element between the generator rotor and the output element; and means controlling the electrical load of the generator comprising means controlling the energization of the direct current field responsive to speed of the output element.

6. In a transmission for transmitting power at constant speed from a variable speed power source; a power input element to be driven by the variable speed source; a power output element; power transmission means between the two elements comprising an alternating current stator, a direct current field element driven at speed proportional to that of the input element for producing a rotary alternating current field in the stator, an induction generator comprising a rotor rotating within the rotating field and having a load circuit and mechanism differentially dividing the power from the input element between the generator rotor and the output element; and means controlling the electrical load of the generator comprising means controlling the energization of the direct current field responsive to speed of the output element; and means to convert the electrical load of the generator into mechanical power and transmit it to the input element.

7. A transmission for transmitting power to a load at constant speed from a variable speed power source comprising: a differential gearing including a spider element rotatably supporting a pinion, and two differential gears meshed with the pinion; one differential gear constituting a power output element; the spider element being driven by the power source; an alternating current stator; a direct current field element driven by the spider and producing an alternating rotary field in the stator; an induction generator comprising a rotor driven by the other differential gear and having an electrical load circuit; means to neutralize the tendency of the output element to change speed, comprising control means to change the energization of the direct current field to correspondingly change the electrical load of the generator, and operable responsive to speed of the output element.

8. A transmission for transmitting power to a load at constant speed from a variable speed power source comprising: a differential gearing including a spider element rotatably supporting a pinion, and two differential gears meshed with the pinion; one differential gear constituting a power output element; the spider element being driven by the power source; an alternating current stator; a direct current field element driven by the spider and producing an alternating rotary field in the stator; an induction generator comprising a rotor driven by the other differential gear and having an electrical load circuit; means to neutralize the tendency of the output element to change speed, comprising control means to change the energization of the direct current field to correspondingly change the electrical load of the generator, and operable responsive to speed of the output element; and means to convert the electrical load of the generator into mechanical power and transmit it to the spider element.

9. In a transmission for transmitting power at constant speed from a variable speed power source; a power input element to be driven by the variable speed source; a power output element; power transmission means between the two elements comprising a direct current electric generator having an electric load circuit, and mechanism differentially dividing the power from the input element between the generator and the output element; and means controlling the field energization of the generator to control the electrical load thereof responsive to speed of the output element to maintain the speed of the output element substantially constant.

10. In a transmission for transmitting power at constant speed from a variable speed power source; a power input element to be driven by the variable speed source; a power output element; power transmission means between the two elements comprising a direct current electric generator having an electric load circuit and mechanism differentially dividing the power from the input element between the generator and the output element; and means controlling the field energization of the generator to control the electrical load thereof responsive to speed of the output element to maintain the speed of the output element substantially constant; and means to convert the electrical load of the generator into mechanical power and transmit it to the input element comprising a direct current electric motor associated with the load circuit of the generator and mechanically connected to the input element.

11. In a transmission for transmitting power at constant speed from a variable speed power source; a power input element to be driven by the variable speed source; a power output element; power transmission means between the two elements comprising a variably energizable electrodynamic brake and mechanism differentially dividing the power from the input element between the brake and the output element; and means controlling energization of the brake responsive to speed of the output element to maintain the speed of the output element substantially constant.

12. In a transmission for transmitting power at preselected constant speed from a variable speed power source; a power input element to be driven by the variable speed source; a power output element; an electric generator having a load circuit; means to vary the electrical load of the generator comprising an electrically energizable means, a source of current for energizing it and a rheostat for varying its energization; mechanism for differentially dividing the power from the input element between the generator and the output element; a power take-off from the output element to operate the rheostat comprising reversing means for moving the rheostat in alternate directions actuated by a centrifugal governor driven by the output element.

13. In a transmission for transmitting power at preselected constant speed from a variable speed power source; a power input element to be driven by the variable speed source; a power output element; an electric generator having a load circuit; means to vary the electrical load of the generator comprising an electrically energizable means, a source of current for energizing it and a rheostat for varying its energization; mechanism for differentially dividing the power from the input element between the generator and the output element; a power take-off from the output element to operate the rheostat comprising reversing means for moving the rheostat in alternate directions, an electro-magnetic winding for actuating the reversing means in response to energization of the winding above or below a normal energization, and an electric generator driven by the output element and energizing the winding at normal energization at the preselected constant speed of the output element.

14. In a transmission for transmitting power at preselected constant speed from a variable speed power source; a power input element to be driven by the variable speed source; a power output element; an electric generator having a load circuit; means to vary the electrical load of the generator comprising an electrically energizable means, a source of current for energizing it and a rheostat for varying its energization; mechanism for differentially dividing the power from the input element between the generator and the output element; means to operate the rheostat in alternate directions comprising a pair of differential gearings each including a pair of differential gears and a spider, and means to rotate the spiders in opposite direction; one differential gear of each gearing being gear-connected to the rheostat; each of the other differential gears of the gearings being gear-connected to an electric generator; means to vary the electrical loads of the generators relatively comprising an electro-magnet associated with each generator, and an electric generator driven by the output element for energizing the electro-magnets.

15. In a transmission for transmitting power at preselected constant speed from a variable speed power source; a power input element to be driven by the variable speed source; a power output element; an electric generator having a load circuit; means to vary the electrical load of the generator comprising an electrically energizable means, a source of current for energizing it and a rheostat for varying its energization; mechanism for differentially dividing the power from the input element between the generator and the output element; means to operate the rheostat in alternate directions comprising a pair of differential gearings each including a pair of differential gears and a spider, and means to rotate the spiders in opposite direction; one differential gear of each gearing being gear-connected to the rheostat; each of the other differential gears being mutually drivingly connected to each other; means to vary the mutual driving ratio of the said other differential gears responsive to the speed of one of them.

16. In a transmission for transmitting power at constant speed from a variable speed power source; a power input element to be driven by the variable speed source; a power output element; power transmission means between the two elements, comprising an electric generator having an electric load circuit and mechanism differentially dividing the power from the input element between the generator and the output element; and control means comprising electrically energizable means controlling the load of the generator to thereby control the speed of the output element, a source of current for energizing it, and a device for changing its energization; and governing mechanism for operating the device responsive to an increase or decrease of the speed of the output element to effect correspondingly a decrease or increase of its speed to maintain its speed substantially constant.

17. A transmission for transmitting power to a load at constant speed from a variable speed power source; comprising a differential gearing having a spider element rotatably supporting a pinion and two differential gears meshed with the pinion; one differential gear constituting a power output element; the spider element being driven by the power source; the other differential gear being connected to an electric generator to drive it; an electric load circuit for the generator; means to neutralize the tendency of the output element to change speed comprising electrically energizable control means to change the electrical load of the generator to thereby change the speed of the output element, a source of current for energizing the control means, and a device for changing its energization; and governing mechanism for operating the device responsive to an increase or decrease of the speed of the output element to effect correspondingly a decrease or increase of its speed to maintain its speed substantially constant.

18. In a power supplying apparatus, a differential gearing comprising a spider element rotatably supporting a pinion, and two differential gears both meshed with the pinion, a source of rotary power connected to the spider element to rotatively drive it, a power delivery shaft connected to one differential gear, an alternating current synchronous motor comprising a rotor connected to the spider, an alternating current induction generator comprising a rotor connected to the other differential gear to be rotatively driven thereby and supplying alternating current to the synchronous motor to drive its rotor, and means to adjustably vary the electric power supplied to the synchronous motor.

19. In a power supplying apparatus, a differential gearing comprising a spider element rotatably supporting a pinion, and two differential gears both meshed with the pinion, a source of rotary power connected to the spider element to rotatively drive it, a power delivery shaft connected to one differential gear, an alternating current synchronous motor comprising a rotor connected to the spider, an alternating current induction generator comprising a rotor connected to the other differential gear to be rotatively driven thereby and supplying alternating current to the synchronous motor to drive its rotor, and means to adjustably vary the electrical load of the induction generator.

20. In a power supplying apparatus, a differential gearing comprising a spider element rotatably supporting a pinion, and two differential gears both meshed with the pinion, a source of rotary power connected to the spider element to rotatably drive it, a power delivery shaft connected to one differential gear, an electro-dynamic unit comprising a rotary field element and comprising multiphase stator conductors, means to rotatively drive the field element by power from the power source, a source of direct current and circuit connections for energizing the rotary field element, an alternating current induction generator comprising a rotor connected to the other differential gear to be rotatively driven thereby and comprising multiphase stator conductors, the stator conductors of the electro-dynamic unit and of the induction generator being connected together in mutually reacting relation to cause the unit to produce a rotary field in the induction generator stator in the direction of rotation of its rotor and to cause the induction generator to produce a rotary field in the unit stator in the direction of its field element.

21. In a power supplying apparatus, a differential gearing comprising a spider element rotatably supporting a pinion, and two differential gears both meshed with the pinion, a source of rotary power connected to the spider element to rotatively drive it, a power delivery shaft connected to one differential gear, an alternating current synchronous motor comprising a rotor connected to the rotary power source, an alternating current induction generator comprising a rotor connected to the other differential gear to be rotatively driven thereby and supplying alternating current to the synchronous motor to drive its rotor.

22. In a transmission for transmitting power at constant speed from a variable speed power source; a power input element to be driven by the variable speed source; a power output element; power transmission means between the two elements, comprising an electric generator having an electric load circuit and mechanism differentially dividing the power from the input element between the generator and the output element; movable control means controlling the electrical load of the generator to control the speed of the output element; operating means responsive to communicate movement of the output element to the movable control means and to cause the control means to decrease or increase the generator load, upon the occurrence of an increase or decrease of output element speed above or below a predetermined speed, to effect return of the output element speed to said predetermined speed; and responsive to interrupt said communication of movement upon the return of the output element speed to said predetermined speed; to maintain the output element substantially at said predetermined speed.

23. A transmission for transmitting power to a load at constant speed from a variable speed power source; comprising a differential gearing having a spider element rotatably supporting a pinion and two differential gears meshed with the pinion; one differential gear constituting a power output element; the spider element being driven by the power source; the other differential gear being connected to an electric generator to drive it; an electric load circuit for the generator; movable control means controlling the electrical load of the generator to control the speed of the output element; operating means responsive to communicate movement of the output element to the movable control means and to cause the control means to decrease or increase the generator load, upon the occurrence of an increase or decrease of output element speed above or below a predetermined speed, to effect return of the output element speed to said predetermined speed; and responsive to interrupt said communication of movement upon the return of the output element speed to said predetermined speed; to maintain the output element substantially at said predetermined speed.

LEV A. TROFIMOV.

REFERENCES CITED

The following references are of record in the file of this patent:

UNITED STATES PATENTS

| Number | Name | Date |
| --- | --- | --- |
| 1,667,718 | Connell | May 1, 1928 |

FOREIGN PATENTS

| Number | Country | Date |
| --- | --- | --- |
| 558,334 | France | May 23, 1923 |